(12) United States Patent
Chao

(10) Patent No.: US 8,079,148 B2
(45) Date of Patent: Dec. 20, 2011

(54) FOLDING HAND SAW

(75) Inventor: Walley Chao, Nantou County (TW)

(73) Assignee: K & W Tools Co., Ltd., Nantou County (TW)

( * ) Notice: Subject to any disclaimer, the term of this patent is extended or adjusted under 35 U.S.C. 154(b) by 645 days.

(21) Appl. No.: 12/252,737

(22) Filed: Oct. 16, 2008

(65) Prior Publication Data

US 2009/0288302 A1 Nov. 26, 2009

(30) Foreign Application Priority Data

May 22, 2008 (TW) ................................ 97118960 A

(51) Int. Cl.
*B26B 3/06* (2006.01)
*F41B 13/02* (2006.01)
*F41C 27/18* (2006.01)
*B27B 21/00* (2006.01)

(52) U.S. Cl. ................. 30/161; 30/155; 30/514

(58) Field of Classification Search ............ 30/151, 30/153, 155–161, 166.3, 514, 517–519; 7/118, 7/158

See application file for complete search history.

(56) References Cited

U.S. PATENT DOCUMENTS

| | | | | |
|---|---|---|---|---|
| 1,638,749 A * | 8/1927 | Santoyo | ............... | 30/161 |
| 4,719,700 A * | 1/1988 | Taylor, Jr. | ............... | 30/158 |
| 5,647,129 A * | 7/1997 | Stamper | ............... | 30/139 |
| 5,781,998 A * | 7/1998 | Stamper | ............... | 30/139 |
| 5,924,210 A * | 7/1999 | Hung | ............... | 30/519 |
| 5,926,962 A * | 7/1999 | Chen | ............... | 30/519 |
| 6,253,455 B1 * | 7/2001 | Eriksson et al. | ............... | 30/504 |
| 6,397,477 B1 * | 6/2002 | Collins | ............... | 30/161 |
| 6,694,620 B2 * | 2/2004 | Kanzawa | ............... | 30/161 |
| 6,715,209 B2 * | 4/2004 | Taylor et al. | ............... | 30/155 |
| 7,003,833 B2 * | 2/2006 | Feliciano | ............... | 7/148 |
| 7,168,172 B1 * | 1/2007 | Wang | ............... | 30/517 |
| 7,296,355 B2 * | 11/2007 | Onion | ............... | 30/159 |
| 2004/0158991 A1 * | 8/2004 | Freeman | ............... | 30/161 |

* cited by examiner

*Primary Examiner* — Ghassem Alie
*Assistant Examiner* — Bharat C Patel
(74) *Attorney, Agent, or Firm* — Browdy and Neimark, PLLC

(57) ABSTRACT

A folding hand saw includes a first housing, a transmission unit disposed in the first housing, a second housing having a third pivotal end pivotally connected with a second pivotal end of the first housing and connected with the transmission unit, and a saw blade having a forth pivotal end pivotally connected with a first pivotal end of the first housing and connected with the transmission unit such that the saw blade is pivotable between a folded position where the saw blade is inserted into a first insertion groove of the first housing and a second insertion groove of the second housing, and an unfolded position where the saw blade leaves the first insertion groove and the second insertion groove. As a result, the folding hand saw of the present invention can prevent the saw blade from hurting a user or other people.

8 Claims, 10 Drawing Sheets

FOLDING HAND SAW

BACKGROUND OF THE INVENTION

1. Field of the Invention

The present invention relates generally to a hand saw, and more specifically to a folding hand saw that can be folded when it is unused.

2. Description of the Related Art

A conventional hand saw generally includes a handle and a saw blade fastened to the handle. When the hand saw is unused, the saw blade may be covered by a sheath to prevent the saw blade from hurting a user or somebody.

However, when the sheath is removed from the saw blade, it may be easily lost due to the negligence of the user. Therefore, the saw blade will be exposed and accessible when the saw is unused, resulting in that the probability of hurting the user or somebody will increase. Probably, the user may employ something like the sheath to cover the saw blade, but it will be difficult for the user to find an object with a suitable size to fit the saw blade.

SUMMARY OF THE INVENTION

The present invention has been accomplished in view of the above-noted circumstances. It is one objective of the present invention to provide a folding hand saw which can be folded to prevent a saw blade from hurting a user or somebody when it is unused.

To achieve this objective of the present invention, the folding hand saw comprises a first housing, a transmission unit disposed in the first housing, a second housing having a third pivotal end pivotally connected with a second pivotal end of the first housing and connected with the transmission unit, and a saw blade having a forth pivotal end pivotally connected with a first pivotal end of the first housing and connected with the transmission unit such that the saw blade is pivotable relative to the first housing between a folded position and an unfolded position.

When the saw blade is located at the folded position, the saw blade is inserted into a first insertion groove of the first housing and a second insertion groove of the second housing, and a connecting end of the second housing is distant from the first pivotal end of the first housing. When the saw blade is located at the unfolded position, the saw blade leaves the first insertion groove of the first housing and the second insertion groove of the second housing, and the connecting end of the second housing is joined to the first pivotal end of the first housing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
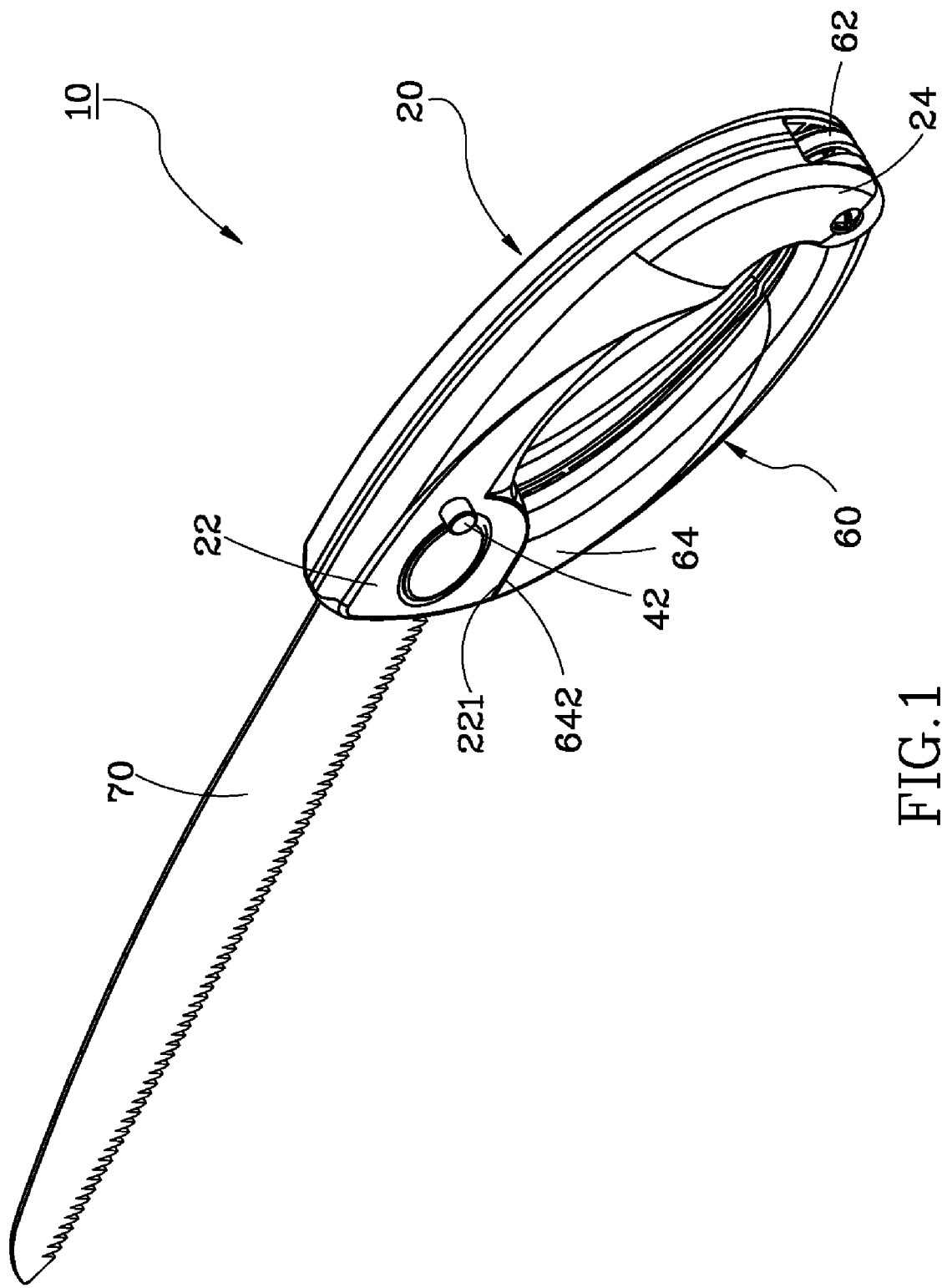
FIG. 1 is a perspective view of a folding hand saw according to a first preferred embodiment of the present invention.
Figure 2:
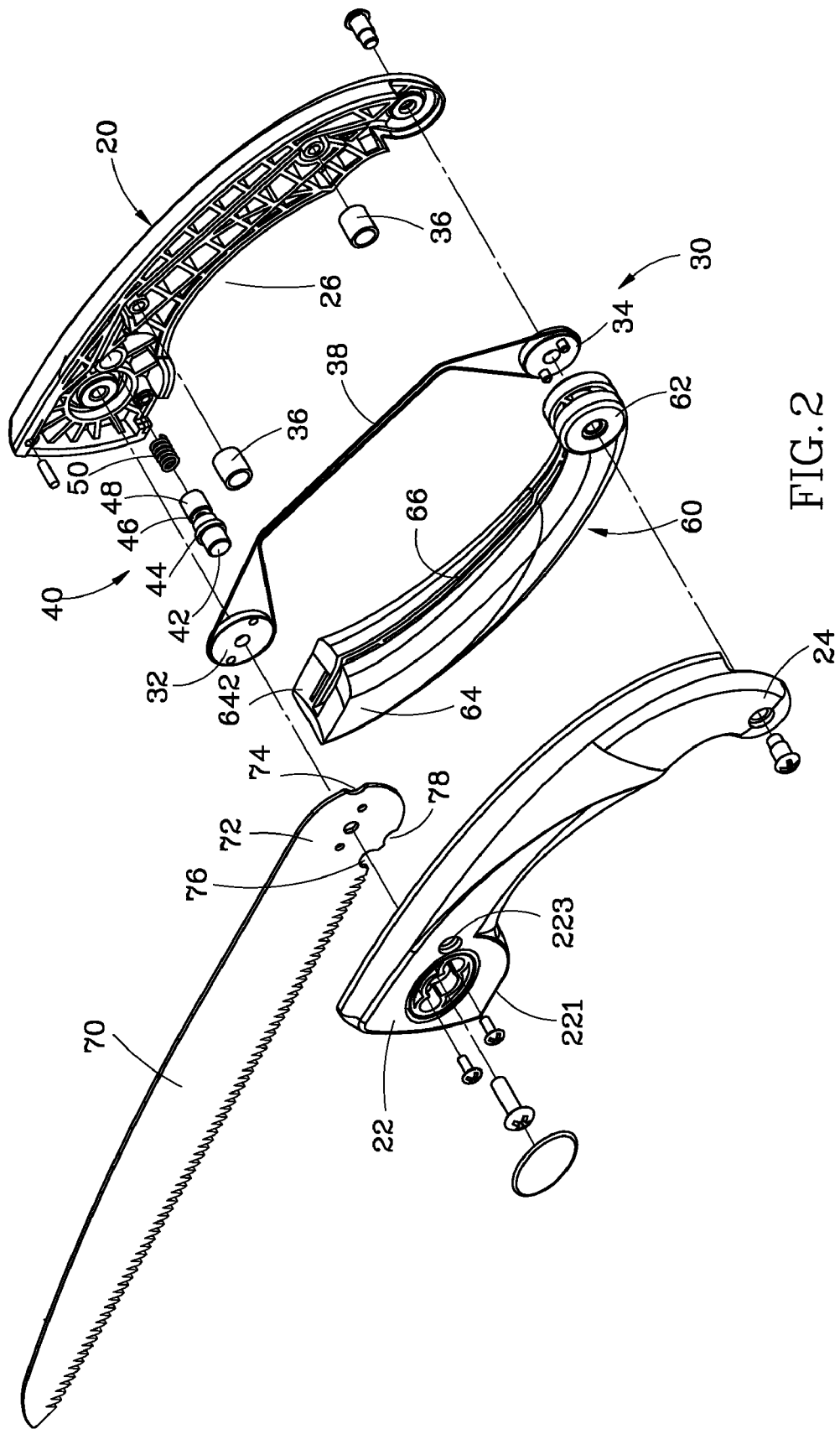
FIG. 2 is an exploded view of the folding hand saw according to the first preferred embodiment of the present invention.

As shown in FIGS. 1 and 2, a folding hand saw 10 in accordance with a first preferred embodiment of the present invention comprises a first housing 20, a transmission unit 30, a button 40, an elastic member 50, a second housing 60, and a saw blade 70.

The first housing 20 has a first pivotal end 22 with a first plane 221 and a hole 223, a second pivotal end 24 opposite to the first pivotal end 22, and a first insertion groove 26.

The transmission unit 30 is disposed in the first insertion groove 26 of the first housing 20. In this embodiment, the transmission unit 30 includes a first wheel 32 rotatably disposed in the first pivotal end 22, a second wheel 34 rotatably disposed in the second pivotal end 24, two rollers 36 located between the first wheel 32 and the second wheel 34, and a steel rope 38 wrapped around the first wheel 32, the second wheel 34, and the rollers 36 for enabling the first wheel 32 and the second wheel 34 to be rotated synchronously.

The button 40 is disposed in the first insertion groove 26 of the first housing 20, including a head portion 42 extending out of the first pivotal end 22 of the first housing 20 through the hole 223 for press by a user, a flange 44 blocked against a periphery wall of the first insertion groove 26 for preventing the button 40 from slipping from the hole 223, a recess 46, and a jamming portion 48.

The elastic member 50 is disposed in the first insertion groove 26 of the first housing 20 and stopped against a bottom of the button 40 for pushing the button 40 outwards.

The second housing 60 has a third pivotal end 62 pivotally connected with the second pivotal end 24 of the first housing 20 and coupled to the second wheel 34 of the transmission unit 30 such that the second housing 60 and the second wheel 34 can be rotated synchronously through the third pivotal end 62, a connecting end 64 with a second plane 642, and a second insertion groove 66.

Figure 3:
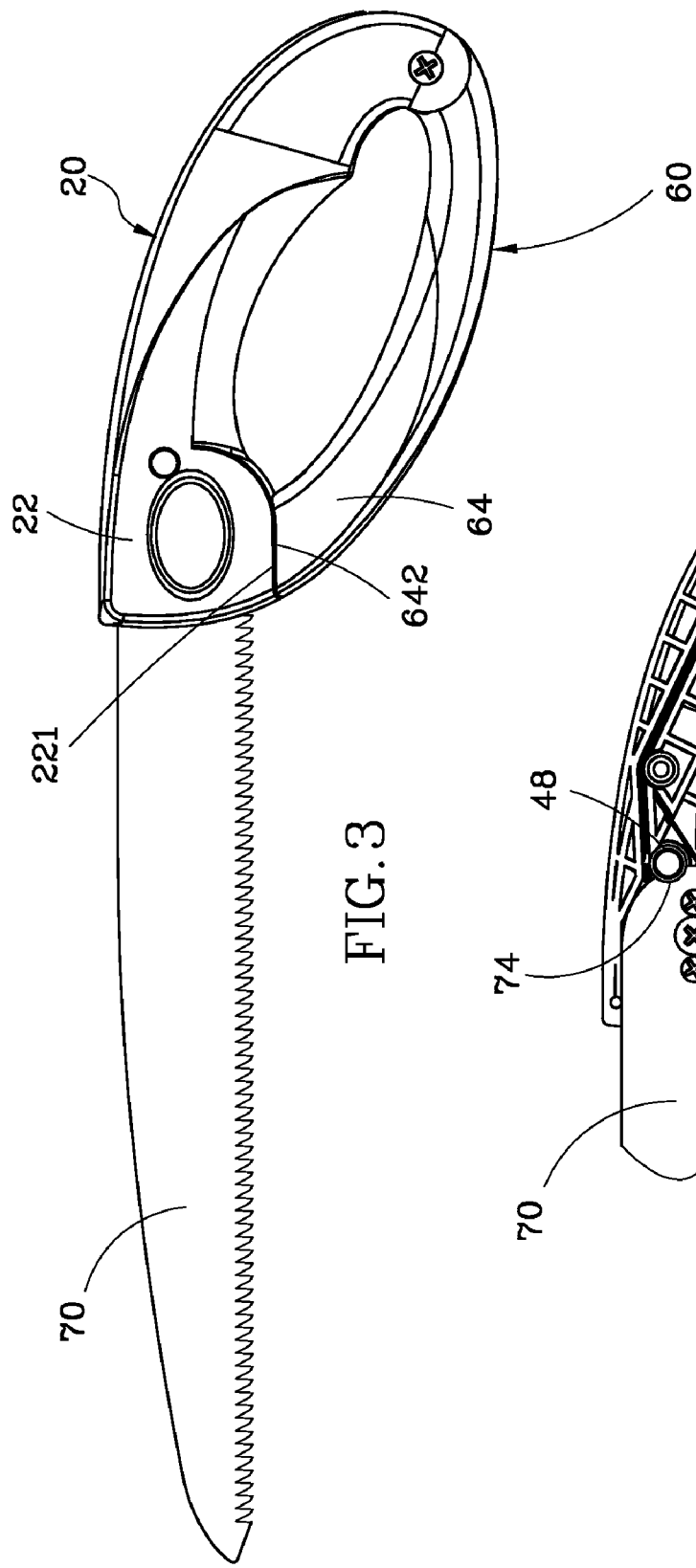
FIG. 3 is a lateral view of the folding hand saw according to the first preferred embodiment of the present invention, showing the saw blade is located at the unfolded position.
Figure 4:
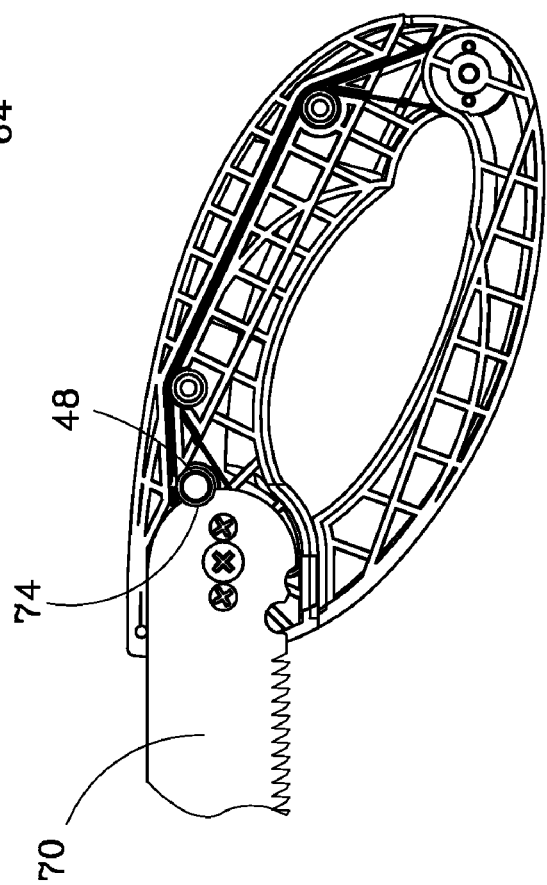
FIG. 4 is a partially cutaway view of the folding hand saw, showing that the jamming portion of the button is engaged with the first notch of the saw blade.
Figure 5:
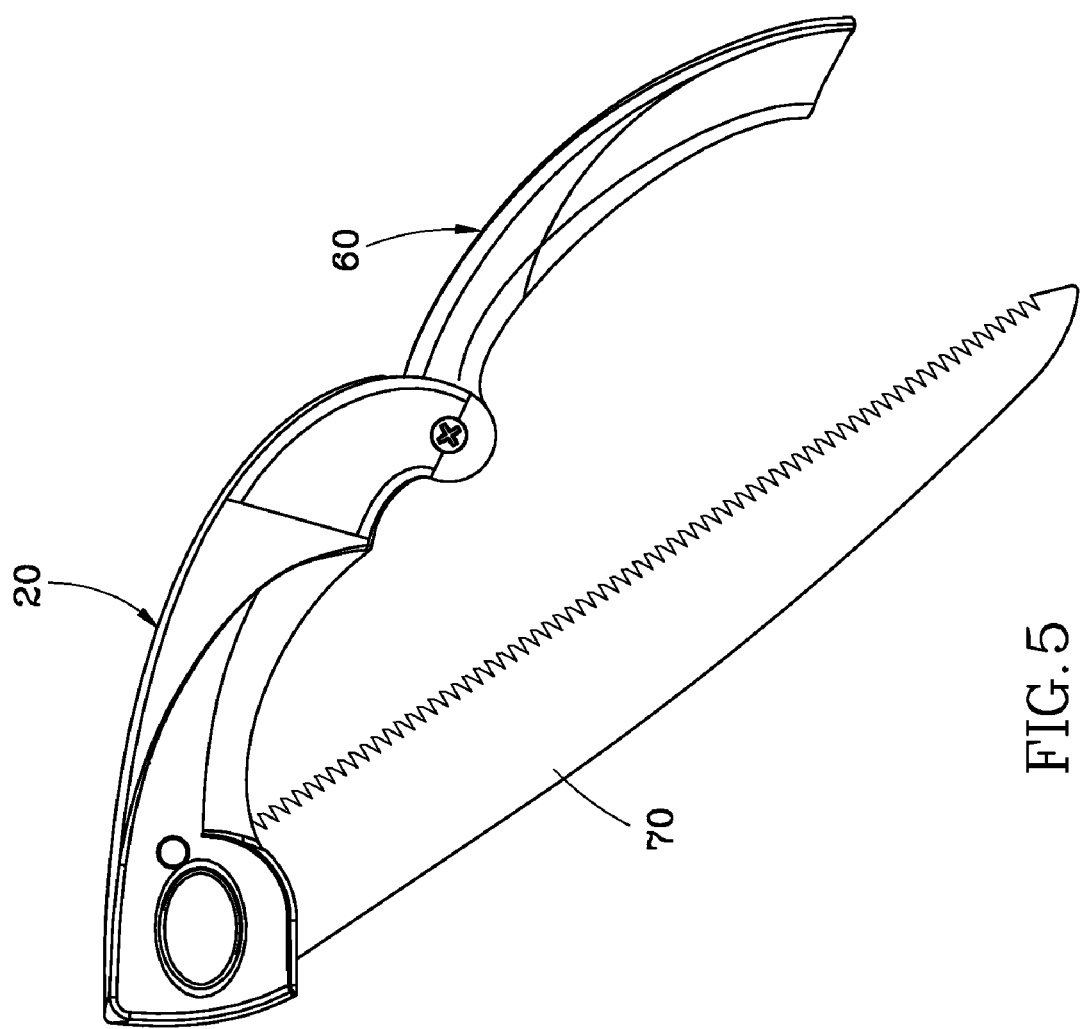
FIG. 5 is another lateral view of the folding hand saw according to the first preferred embodiment of the present invention, showing that the saw blade is pivotally moved from the unfolded position to the folded position.
Figure 6:
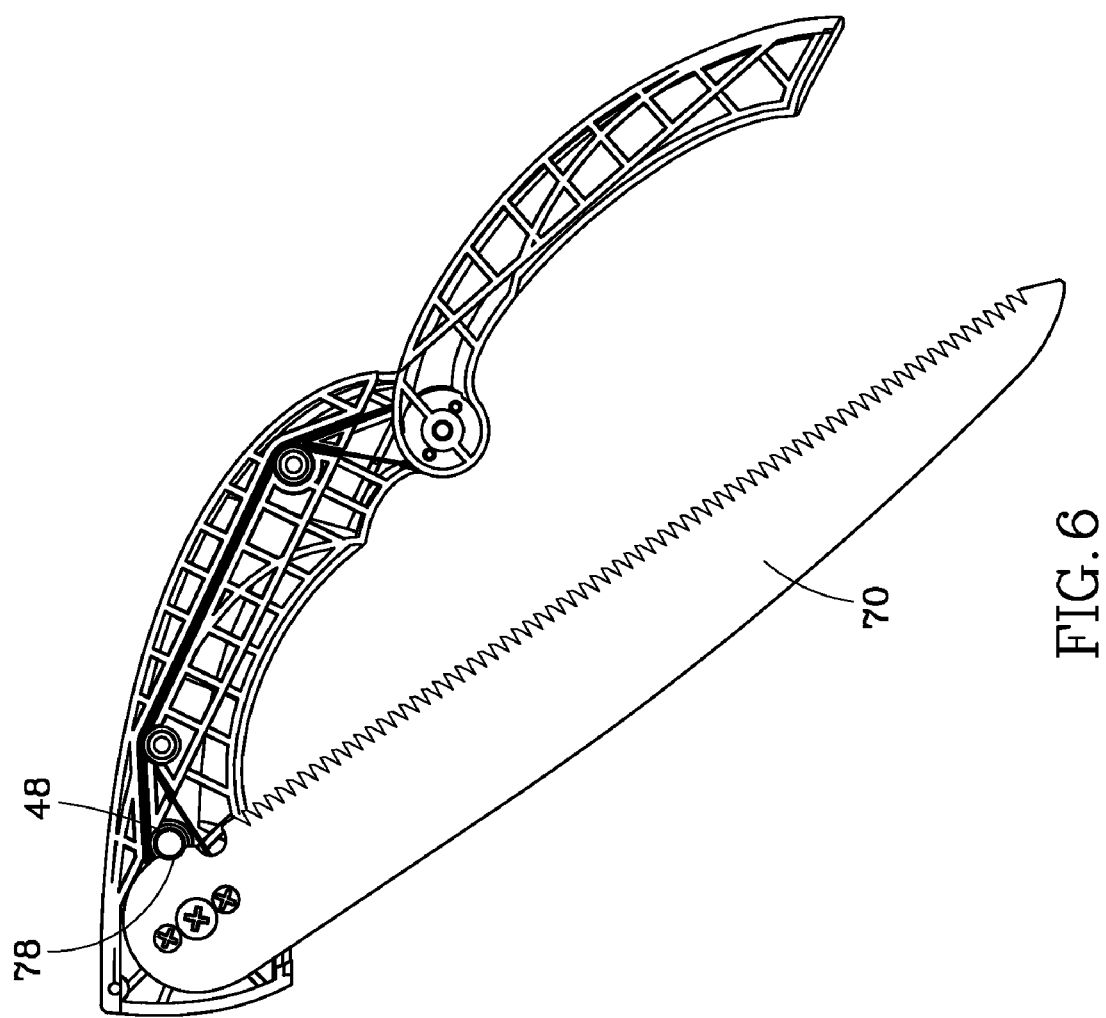
FIG. 6 is a partially cutaway view of the folding hand saw, showing that the jamming portion of the button is engaged with the third notch of the saw blade.
Figure 7:
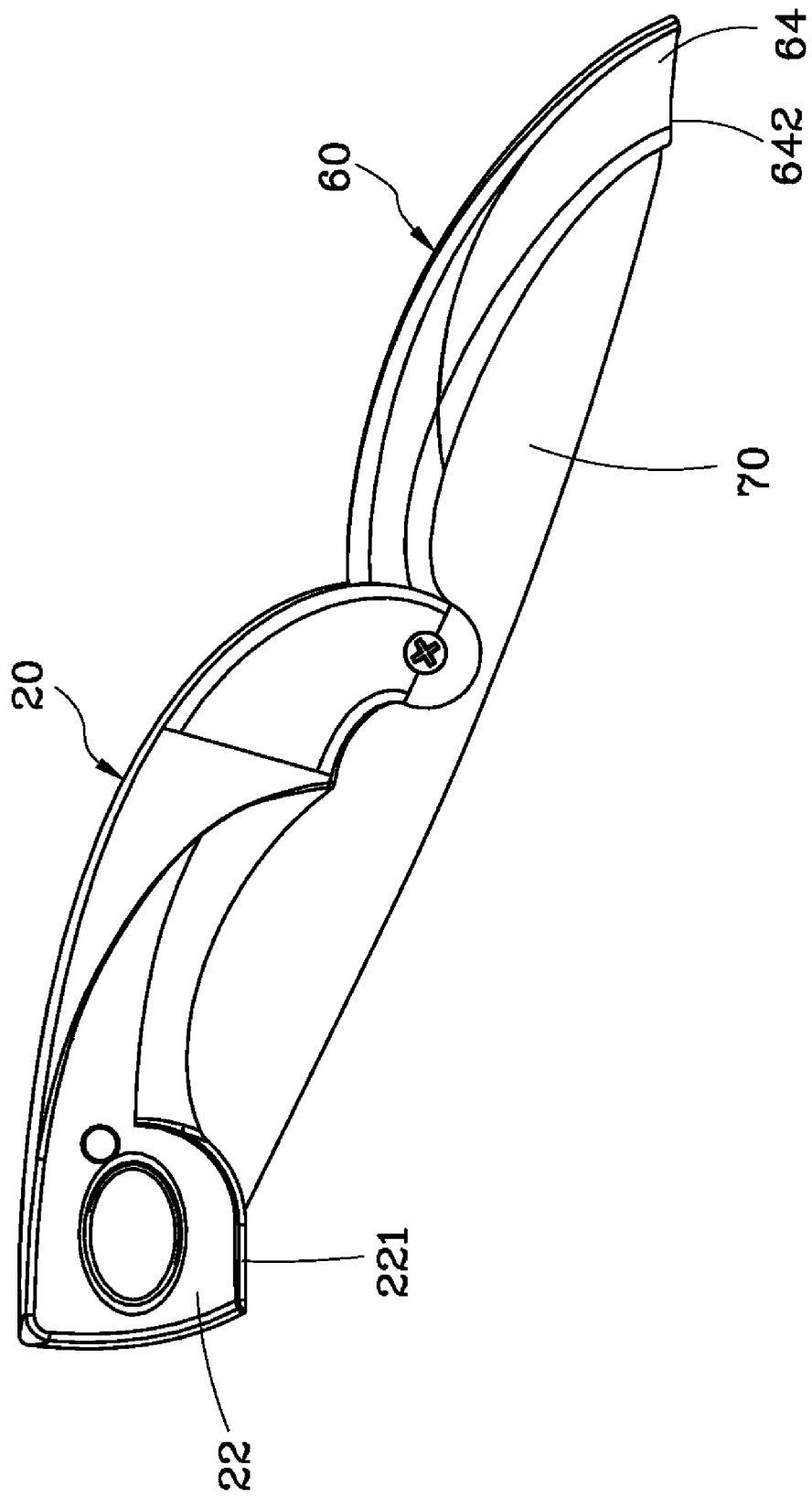
FIG. 7 is still another lateral view of the folding hand saw according to the first preferred embodiment of the present invention, showing that the saw blade is located at the folded position.
Figure 8:
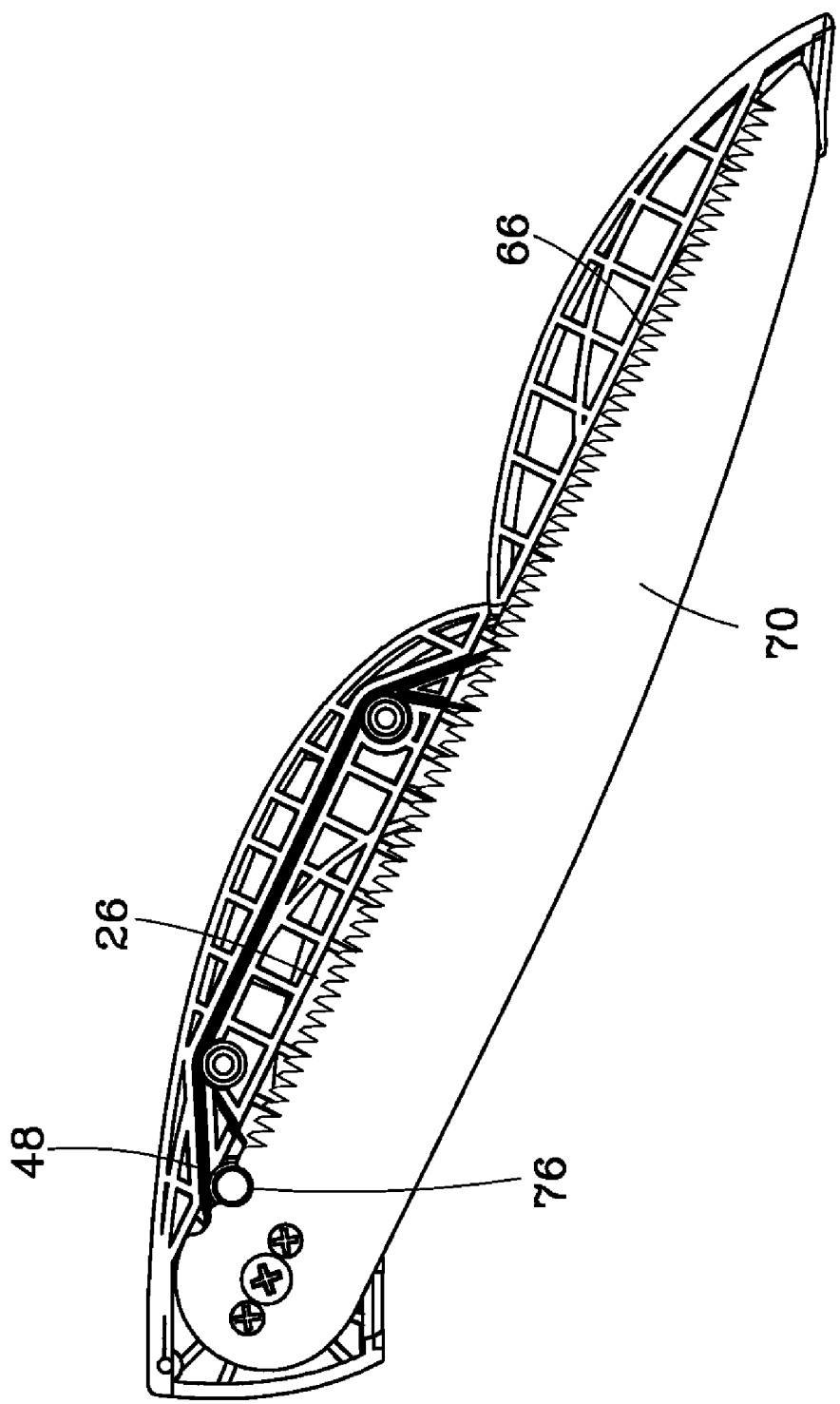
FIG. 8 is a partially cutaway view of the folding hand saw, showing that the jamming portion of the button is engaged with the second notch of the saw blade.

The saw blade 70 has a forth pivotal end 72 pivotally connected with the first pivotal end 22 of the first housing 20 and coupled to the first wheel 32 of the transmission unit 30 such that the saw blade 70 and the first wheel 32 can be pivotally moved synchronously through the forth pivotal end 72. The saw blade 70 is pivotable between a folded position and an unfolded position. When the saw blade 70 is located at the folded position, the saw blade 70 is inserted into the first insertion groove 26 of the first housing 20 and the second insertion groove 66 of the second housing 60, and the connecting end 64 of the second housing 60 is distant from the first pivotal end 22 of the first housing 20, as shown in FIGS. 7 and 8. When the saw blade 70 is located at the unfolded position, the saw blade 70 leaves the first insertion groove 26 of the first housing 20 and the second insertion groove 66 of the second housing 60, and the second plane 642 of the connecting end 64 of the second housing 60 is abutted against the first plane 221 of the first pivotal end 22 of the first housing 20, as shown in FIGS. 3 and 4. Further, the forth pivotal end 72 of the saw blade 70 has a first notch 74, a second notch 76, and a third notch 78 between the first notch 74 and the second notch 76. When the saw blade 70 is located at the folded position, the jamming portion 48 of the button 40 is engaged with the second notch 76 of the saw blade 70 for holding the saw blade 70 in the folded position, as shown in FIG. 8. When the saw blade 70 is located at the unfolded position, the jamming portion 48 of the button 40 is engaged with the first notch 74 of the saw blade 70 for holding the saw blade 70 in the unfolded position, as shown in FIG. 4. Besides, when the jamming portion 48 of the button 40 is engaged with the third notch 78 of the saw blade 70, the saw blade 70 is at the partially folded position, as shown in FIGS. 5 and 6. When the recess 46 of the button 40 is engaged with the first notch 74 or the second notch 76 of the saw blade 70, the saw blade 70 is pivotable relative to the first housing 20.

To extend the saw blade 70, a user may press the head portion 42 of the button 40 to force the recess 46 of the button 40 to be engaged with the second notch 76 of the saw blade 70 for enabling the saw blade 70 to be pivotally moveable from the folded position to the unfolded position. At this time, the forth pivotal end 72 of the saw blade 70 can drive the first wheel 32 of the transmission unit 30 to rotate clockwise, and simultaneously drive the second wheel 34 to rotate through the steel rope 38 such that the third pivotal end 62 of the second housing 60 can be pivotally moved by means of the rotation of the second wheel 34 to force the second housing 60 to be pivotally moved toward the first housing 20 until the first notch 74 of the saw blade 70 is engaged with the jamming portion 48 of the button 40, thereby causing the saw blade 70 to leave the first insertion groove 26 of the first housing 20 and the second insertion groove 66 of the second housing 60, and holding the saw blade 70 in the unfolded position, as shown in FIGS. 3 and 4. As a result, the second plane 642 of the connecting end 64 of the second housing 60 is abutted against the first plane 221 of the first pivotal end 22 of the first housing 20 to make the first housing 20 and the second housing 60 form a handle for holding by the user.

After completing the cutting works, the user may press the button 40 to force the recess 46 of the button 40 to be engaged with the second notch 76 of the saw blade 70 again for enabling the saw blade 70 to be pivotally moveable from the unfolded position to the folded position. At this moment, the forth pivotal end 72 of the saw blade 70 can drive the first wheel 32 and the second wheel 34 of the transmission unit 30 to rotate counterclockwise such that the third pivotal end 62 of the second housing 60 can be pivotally moved by means of the rotation of the second wheel 34 to force the second housing 60 to be pivotally moved away from the first housing 20 until the second notch 76 of the saw blade 70 is engaged with the jamming portion 48 of the button 40, thereby causing the saw blade 70 to be inserted into the first insertion groove 26 of the first housing 20 and the second insertion groove 66 of the second housing 60, and holding the saw blade 70 in the folded position, as shown in FIGS. 7 and 8. Accordingly, the first housing 20 and the second housing 60 can be regarded as a sheath to prevent the unused saw blade 70 from exposure to the outsides to hurt the user or other people.

Figure 10:
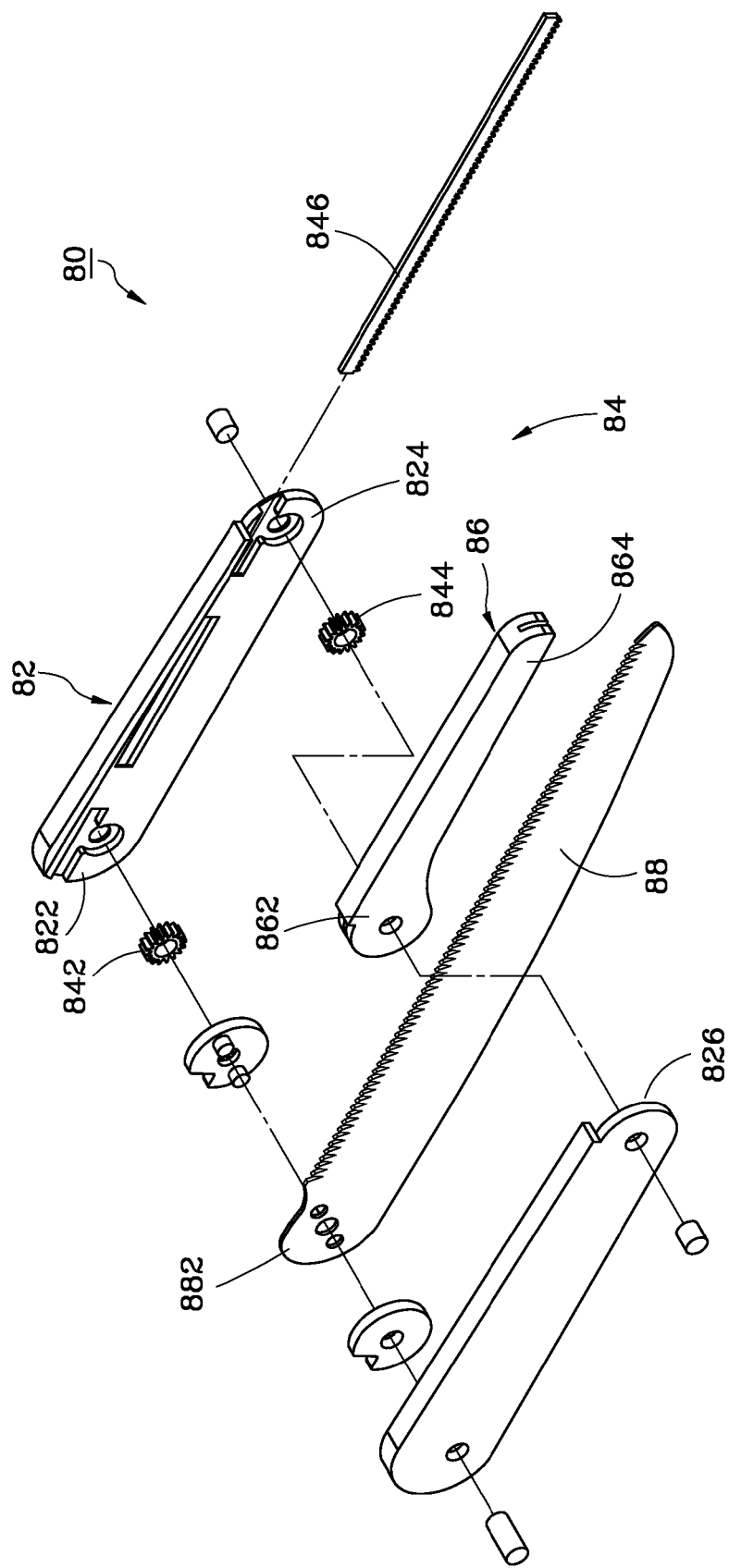
FIG. 10 is an exploded view of the folding hand saw according to the second preferred embodiment of the present invention.

FIG. 10 shows a folding hand saw 80 in accordance with a second preferred embodiment of the present invention. The transmission unit 84 of this embodiment includes a first gear 842 rotatably disposed in the first pivotal end 822 of the first housing 82 and connected with the forth end 882 of the saw blade 88, a second gear 844 rotatably disposed in the second pivotal end 824 of the first housing 82 and connected with third pivotal end 862 of the second housing 86, and a rack 846 meshed with the first gear 842 and the second gear 844.

Figure 9:
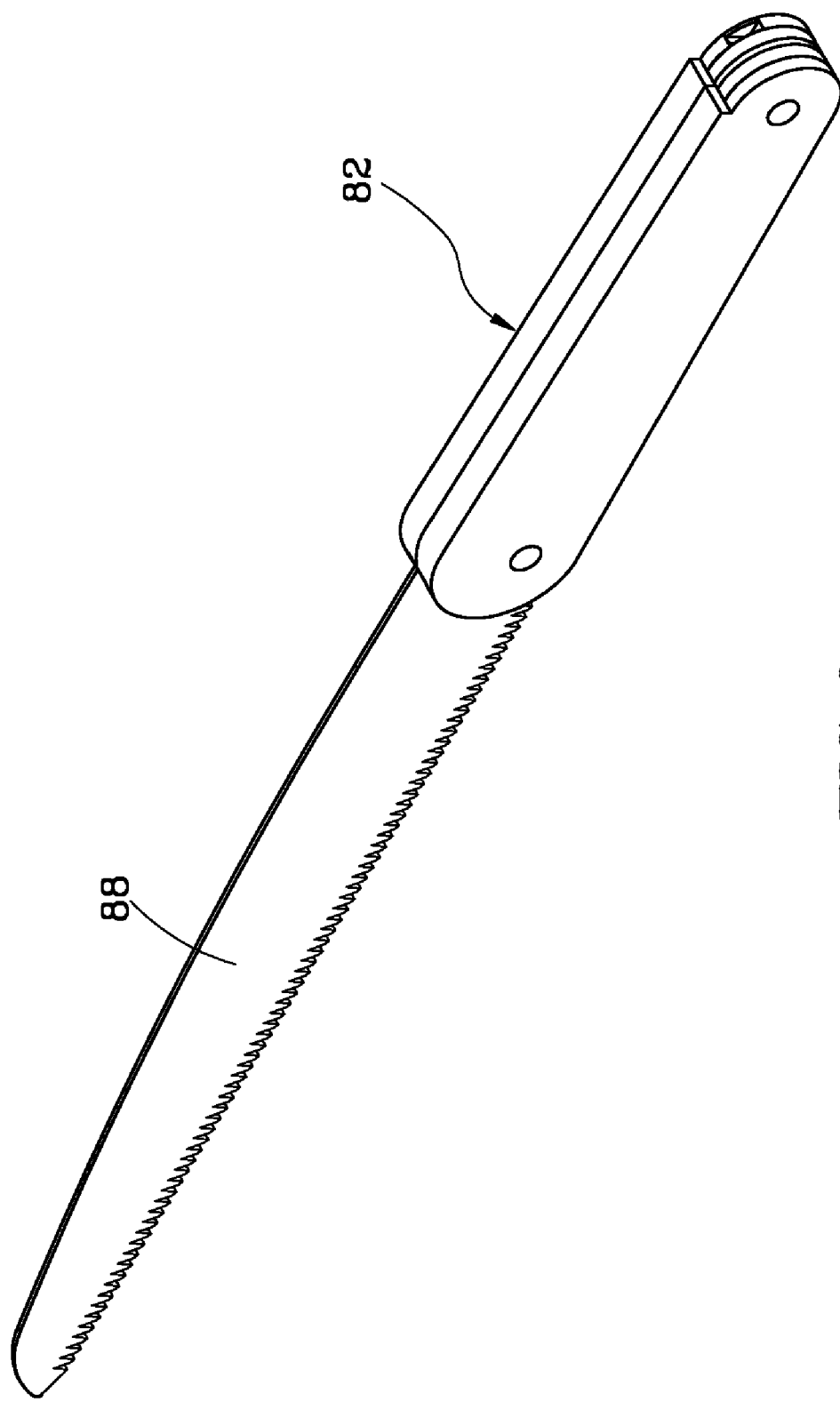
FIG. 9 is a perspective view of the folding hand saw according to a second preferred embodiment of the present invention, showing that the saw blade is located at the unfolded position.
Figure 11:
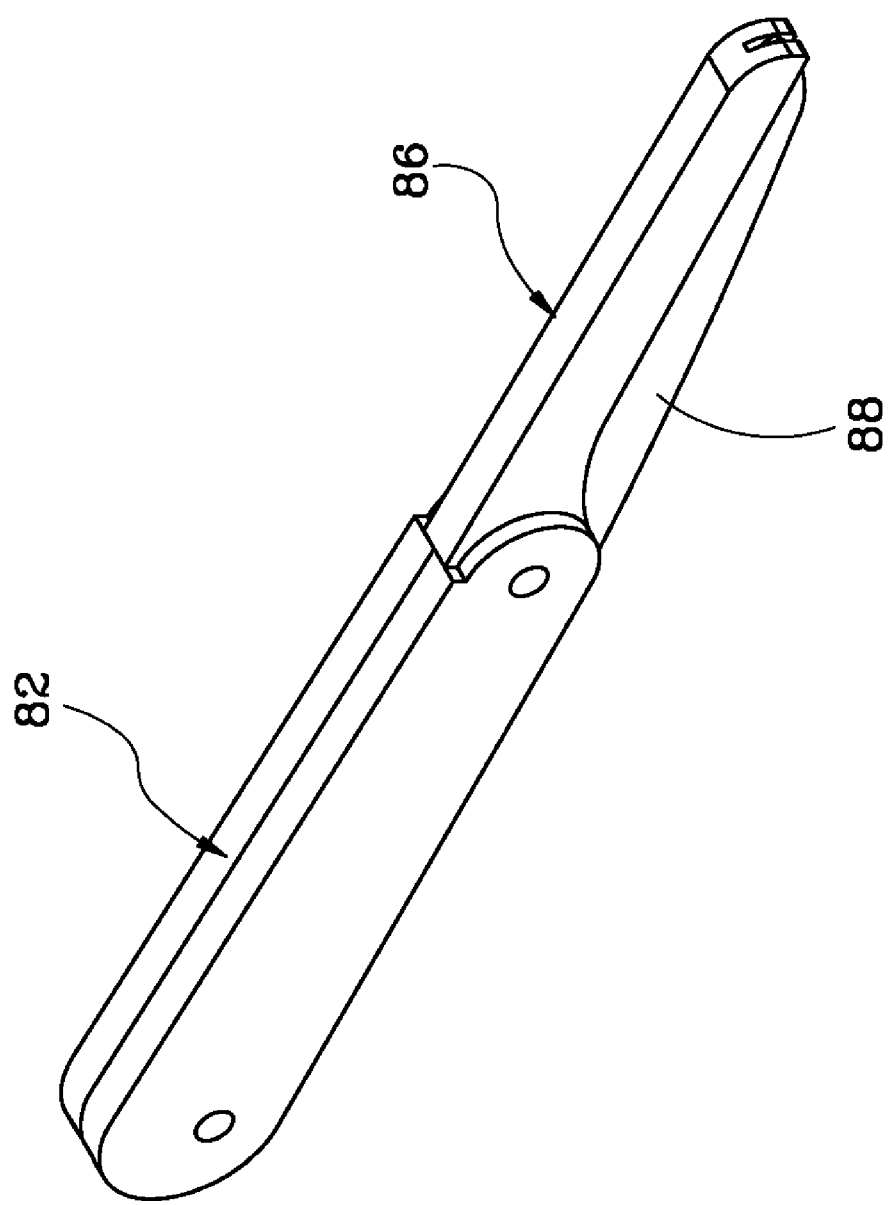
FIG. 11 is a perspective view of the folding hand saw according to the second preferred embodiment of the present invention, showing that the saw blade is located at the folded position.

When the saw blade 88 is pivotally moved between the folded position and the unfolded position, the second housing 86 can be pivotally moved by means of the first gear 842, the rack 846, and the second gear 844 such that the second housing 86 leaves the first insertion groove 826 of the first housing 82 when the saw blade 88 is located at the folded position, as shown in FIG. 11, and the second housing 86 is inserted into the first insertion groove 826 of the first housing 82 when the saw blade 88 is located at the unfolded position for enabling the connecting end 864 of the second housing 86 to be located inside the first pivotal end 822 of the first housing 82, as shown in FIG. 9.

Accordingly, the saw blade can be accommodated inside the first housing and the second housing such that the folding hand saw of the present invention can prevent the saw blade from hurting the user or other people when it is unused.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A folding hand saw comprising:
   a first housing having a first insertion groove, a first pivotal end and a second pivotal end;
   a transmission unit disposed in said first housing;
   a second housing having a third pivotal end pivotally connected with said second pivotal end of said first housing and connected with said transmission unit, a connecting end, and a second insertion groove; and
   a saw blade having a forth pivotal end pivotally connected with said first pivotal end of said first housing and connected with said transmission unit such that said saw blade is pivotable relative to said first housing between a folded position where said saw blade is inserted into said first insertion groove of said first housing and said second insertion groove of said second housing, and said connecting end of said second housing is distant from said first pivotal end of said first housing, and an unfolded position where said saw blade leaves said first insertion groove of said first housing and said second insertion groove of said second housing, and said connecting end of said second housing is joined to said first pivotal end of the said first housing;

wherein said transmission unit includes a first wheel rotatably disposed in said first pivotal end of said housing and connected with said forth pivotal end of said saw blade, a second wheel rotatably disposed in said second pivotal end of said first housing and connected with said third pivotal end of said second housing, and a steel rope wrapped around said first wheel and said second wheel.

2. The folding hand saw as claimed in claim 1, further comprising a button having a jamming portion engaged with a first notch of said forth pivotal end of said saw blade when said saw blade is located at said folded position, and engaged with a second notch of said forth pivotal end of said saw blade when said saw blade is located at said unfolded position, and a recess engagable with one of said first notch and said second notch of said saw blade for enabling said saw blade to be pivotable relative to said first housing.

3. The folding hand saw as claimed in claim 2, wherein said button having a head portion extending through a hole of said first housing, and a flange blocked against a periphery wall of said first insertion groove.

4. The folding hand saw as claimed in claim 2, wherein forth pivotal end of said saw blade has a third notch between said first notch and said second notch for engagement of said jamming portion of said button.

5. The folding hand saw as claimed in claim 2, further comprising an elastic member disposed in said first insertion groove of said first housing and stopped against said button.

6. The folding hand saw as claimed in claim 1, wherein said first pivotal end of said housing has a first plane, and said connecting end of said second pivotal end has a second plane abutted against said first plane when said saw blade is located at said unfolded position.

7. The folding hand saw as claimed in claim 1, wherein said transmission unit includes a first gear rotatably disposed in said first pivotal end of said first housing and connected with said forth pivotal end of saw blade, a second gear rotatably disposed in said second pivotal end of said first housing and connected with said third pivotal end of said second housing, and a rack meshed with said first gear and said second gear.

8. The folding hand saw as claimed in claim 1, wherein said second housing is inserted into said first insertion groove of said first housing for enabling said connecting end of said second housing to be accommodated inside said first pivotal end of said first housing when said saw blade is located at said unfolded position.

* * * * *